(12) United States Patent
Shiepe et al.

(10) Patent No.: US 6,585,869 B2
(45) Date of Patent: Jul. 1, 2003

(54) MEANS OF MAINTAINING COMPRESSION OF THE ACTIVE AREA IN AN ELECTROCHEMICAL CELL

(75) Inventors: Jason K. Shiepe, Middletown, CT (US); Mark E. Dristy, Manchester, CT (US); Trent M. Molter, Glastonbury, CT (US); Lawrence C. Moulthrop, Jr., Windsor, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 100 days.

(21) Appl. No.: 09/835,502

(22) Filed: Apr. 16, 2001

(65) Prior Publication Data

US 2001/0013469 A1 Aug. 16, 2001

Related U.S. Application Data

(63) Continuation of application No. 09/413,782, filed on Oct. 7, 1999, now Pat. No. 6,365,032.
(60) Provisional application No. 60/114,559, filed on Dec. 31, 1998.

(51) Int. Cl.[7] .................................................. C25B 9/00
(52) U.S. Cl. ....................................... 204/252; 204/263

(58) Field of Search ............................... 204/263–266, 204/279, 252, 253–258

(56) References Cited

U.S. PATENT DOCUMENTS

| 4,317,864 A | | 3/1982 | Strasser ........................ 429/36 |
| 4,643,818 A | * | 2/1987 | Seko et al. ................... 204/253 |
| 4,732,660 A | | 3/1988 | Plowman et al. ............ 204/265 |
| 5,009,968 A | | 4/1991 | Guthrie et al. |
| 5,324,565 A | | 6/1994 | Leonida et al. .............. 428/131 |
| 5,466,354 A | | 11/1995 | Leonida et al. |
| 5,580,672 A | | 12/1996 | Zagaja, III et al. .......... 204/265 |
| 5,824,199 A | | 10/1998 | Simmons et al. ............ 204/265 |
| 6,171,719 B1 | | 1/2001 | Roy et al. ..................... 429/39 |

FOREIGN PATENT DOCUMENTS

| WO | WO 98/23794 | 6/1998 |
| WO | WO 98/40537 | 9/1998 |

* cited by examiner

Primary Examiner—Donald R. Valentine
(74) Attorney, Agent, or Firm—Cantor Colburn LLP

(57) ABSTRACT

The present invention relates to a unique electrochemical cell stack which employs an electrically conductive pressure pad. The pressure pad is composed of material compatible with the electrochemical cell environment and is disposed on the high pressure side of the membrane assembly, in intimate contact with the high pressure side screen pack.

32 Claims, 2 Drawing Sheets

MEANS OF MAINTAINING COMPRESSION OF THE ACTIVE AREA IN AN ELECTROCHEMICAL CELL

CROSS-REFERENCE TO RELATED APPLICATIONS

This application is a continuation of U.S. application Ser. No. 09/413,782 filed Oct. 7, 1999, now U.S. Pat. No. 6,365,032 which claims priority to and incorporates by reference U.S. Provisional Application Ser. No. 60/114,559 filed Dec. 31, 1998.

TECHNICAL FIELD

The present invention relates to a means of maintaining compression within the active area of an electrochemical cell, and especially relates to the use of a pressure pad assembly to maintain compression within the active area on the high pressure side of an electrochemical cell.

BACKGROUND OF THE INVENTION

Electrochemical cells are energy conversion devices, usually classified as either electrolysis cells or fuel cells. A proton exchange membrane electrolysis cell functions as a hydrogen generator by electrolytically decomposing water to produce hydrogen and oxygen gases. Referring to FIG. 1, in a typical single anode feed water electrolysis cell 101, process water 102 is reacted at oxygen electrode (anode) 103 to form oxygen gas 104, electrons, and hydrogen ions (protons) 105. The reaction is created by the positive terminal of a power source 106 electrically connected to anode 103 and the negative terminal of a power source 106 connected to hydrogen electrode (cathode) 107. The oxygen gas 104 and a portion of the process water 102' exit cell 101, while protons 105 and water 102" migrate across proton exchange membrane 108 to cathode 107 where hydrogen gas 109, is formed.

The typical electrochemical cell includes a number of individual cells arranged in a stack with fluid, typically water, forced through the cells at high pressures. The cells within the stack are sequentially arranged including a cathode, a proton exchange membrane, and an anode. The cathode/membrane/anode assemblies (hereinafter "membrane assembly") are supported on either side by packs of screen or expanded metal which are in turn surrounded by cell frames and separator plates to form reaction chambers and to seal fluids therein. The screen packs establish flow fields within the reaction chambers to facilitate fluid movement and membrane hydration, and to provide mechanical support for the membrane and a means of transporting electrons to and from electrodes.

In order to maintain uniform compression in the cell active area, i.e., the electrodes, thereby maintaining intimate contact between flow fields and cell electrodes over long time periods, pressure pads have traditionally been used within electrochemical cells. Pressure pads have traditionally been fabricated from materials incompatible with systems fluids and/or the cell membrane, such as silicone rubber, thereby requiring that these pressure pads be disposed within a protective encasing.

Pressure pads are typically preloaded to stress levels which counteract those resulting from the pressurization levels of the working fluids of the electrochemical cell plus approximately 50 p.s.i. to guarantee contact between the cell parts. For example, in an electrolyzer which operates at about 400 p.s.i., the pressure pad is designed to handle 650 p.s.i., which constitutes the proof pressure of the unit (1.5 times the working pressure) plus 50 p.s.i. Typically, during operation, these pads are maintained at a compression stress level of from 50 to about 500 p.s.i. Unfortunately, the elastomer materials typically used for the pressure pad take a compression set and chemically break down when compressed to the higher stress levels.

What is needed in the art is an improved pressure pad which maintains uniform compression, can be utilized at pressures exceeding 2,000 p.s.i. and which is compatible with the electrochemical cell environment.

SUMMARY OF THE INVENTION

The present invention relates to a unique electrochemical cell comprising: an anode; a cathode; a membrane disposed between said anode and said cathode; an anode screen pack located adjacent to and in intimate contact with said anode; a cathode screen pack located adjacent to and in intimate contact with said cathode; and an electrically conductive pressure pad located adjacent to and in intimate contact with a side of said cathode screen pack opposite said cathode.

The above discussed and other features and advantages of the present invention will be appreciated and understood by those skilled in the art from the following detailed description and drawings.

BRIEF DESCRIPTION OF THE DRAWINGS

Referring now to the drawings, which are meant to be exemplary not limiting, and wherein like elements are numbered alike in the several FIGURES.

BEST MODE FOR CARRYING OUT THE INVENTION

Figure 1:
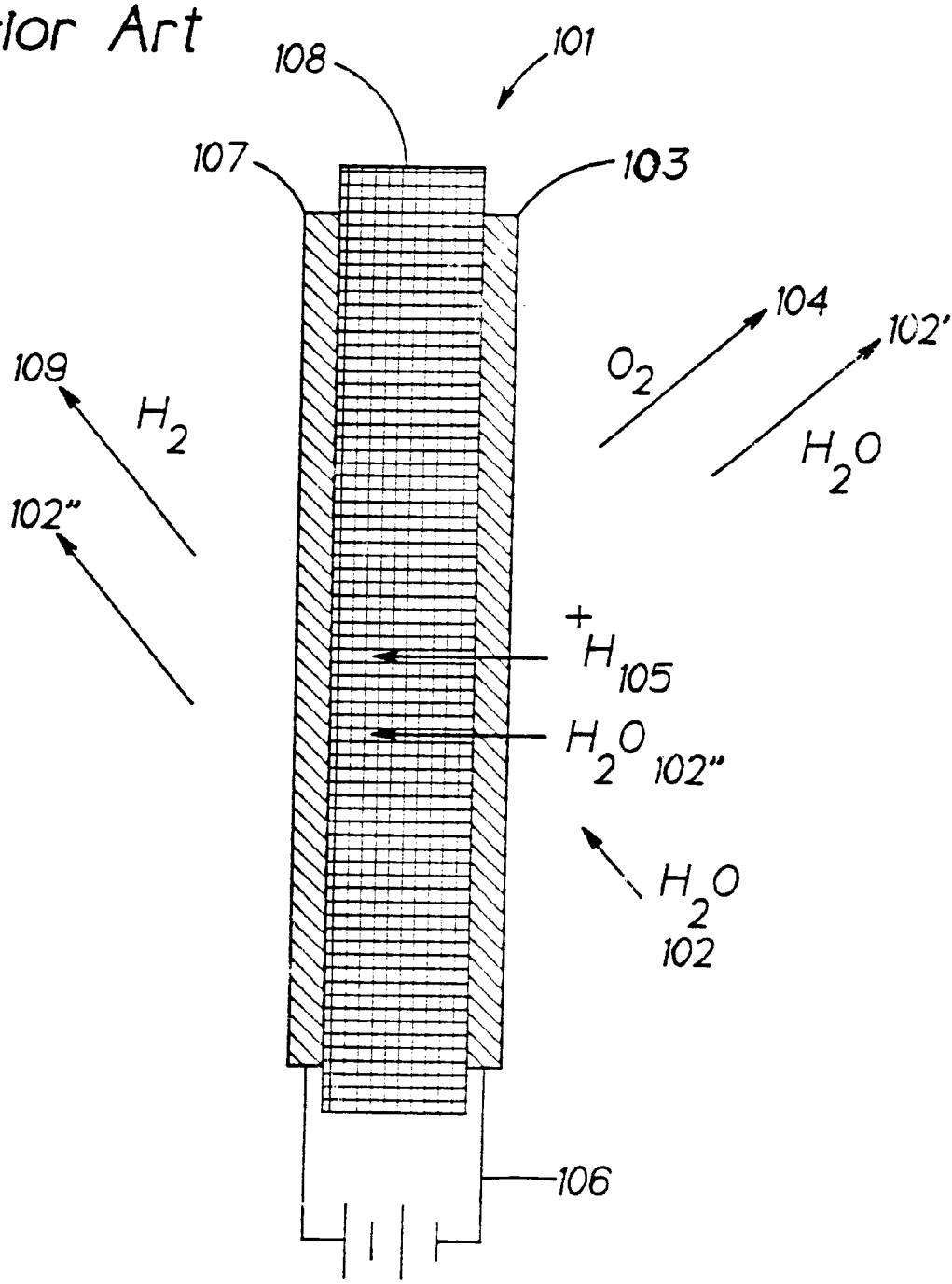
FIG. 1 is a schematic diagram of a prior art electrochemical cell showing an electrochemical reaction.

The present invention relates to a unique pressure pad and its use within an electrochemical cell. This pressure pad, unlike prior art pressure pads, can be utilized on the high pressure side of the electrochemical cell in intimate contact with the screen pack thereof, or as a replacement therefore.

The pressure pad of the present invention comprises a support material and an electrically conductive material which is compatible with the electrochemical cell environment. Preferably, this pressure pad has a size (especially a diameter) and geometry substantially similar to that of the screen pack. Possible elastomeric materials include, but are not limited to silicones, such as fluorosilicones, fluoroelastomers, such as Kalrez® (commercially available from Dupont de Nemours, Wilmington, Del.), Viton® (commercially available from Dupont de Nemours), and Fluorel® (commercially available from 3M, Michigan); combinations and mixtures thereof, among other elastomers, with fluoroelastomers preferred. Possible electrically conductive materials which can be utilized in this invention include, but are not limited to, steels, such as stainless steel, nickel, cobalt, carbon, precious metals, and refractory metals, among others and mixtures and alloys thereof. The type, size, and geometry of the electrically conductive material are based upon the need to conduct current from one side of the pressure pad to the other. Consequently, any material geometry capable of conducting such electrical current can be utilized. Particles, cloths (woven and nonwoven), fibers (random and preformed) or other continuous pieces or strips can be used, with, in one embodiment, fibers or other continuous pieces preferred due to the requirements of a relatively high pressure to create an electrical pad when employing particulate.

For example, strips of steel or carbon fibers can be woven into elastomeric material to form the pressure pad. The steel strips or carbon fibers may be interwoven with elastomeric strips or fibers, or stitched directly into an elastomeric substrate. In another example, carbon fibers and Viton cord can be woven together to form the pressure pad; where Viton cord can be directly woven into a carbon cloth substrate, or the Viton cord and carbon fibers can be woven together.

The pressure pad is disposed in intimate contact with the high pressure flow field, which may be a screen pack. The cathode screen pack as well as the anode screen pack can be any conventional screen capable of supporting the membrane, allowing the passage of hydrogen gas and water, and oxygen gas and water, respectively, and of passing electrical current. Typically the screens are composed of layers of perforated sheets or a woven mesh formed from metal or strands. These screens are typically composed of material such as niobium, zirconium, tantalum, titanium, steels, such as stainless steel, nickel, and cobalt, among others and alloys thereof. The geometry of the openings in the screens can range from ovals, circles and hexagons to diamonds and other elongated shapes. An especially preferred screen assembly for use in electrochemical cells is disclosed in commonly assigned U.S. patent Ser. No. 09/102,305 now abandoned, (herein incorporated by reference).

The screen assembly supports a membrane assembly composed of a cathode/membrane/anode arrangement wherein the cathode and anode are disposed in intimate contact with the membrane and the screened assemblies are disposed in intimate contact with the cathode and anode accordingly. The membrane can be any conventional membrane including, but not limited to, proton exchange membranes including homogeneous perfluoroionomers such as Nafion® (commercially available from E. I. duPont de Nemours and Company, Wilmington, Del.), ionomer Teflon® composites such as Gore Select® (commercially available from W. L. Gore Associates, Inc., Elkton, Md.), styrene, such as sulfonated styrene, benzene such as divinyl benzene, and mixtures thereof. Similarly, the cathode and anode electrodes can be conventional electrodes composed of materials such as platinum, palladium, rhodium, carbon, gold, tantalum, tungsten, ruthenium, iridium, osmium, alloys thereof and other catalysts capable of electrolyzing water and producing hydrogen.

Figure 2:
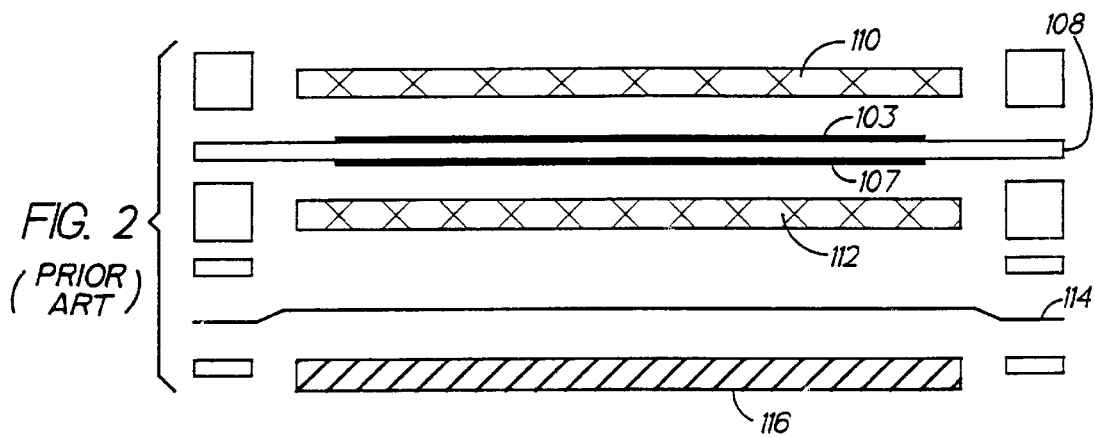
FIG. 2 is a schematic diagram of a prior art electrochemical cell showing a conventional pressure pad and its location.
Figure 3:
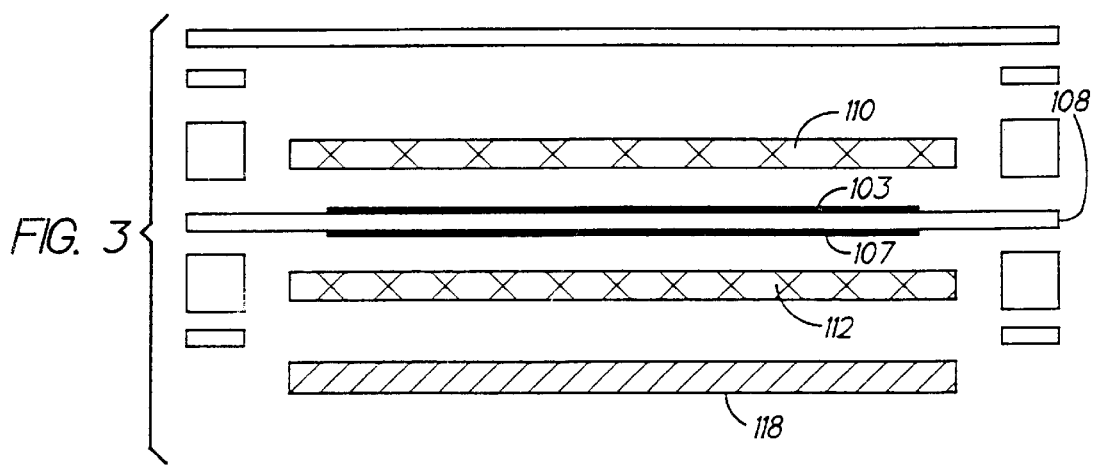
FIG. 3 is a schematic diagram of the electrochemical cell of the present invention showing the pressure pad and its location.

Referring to FIGS. 2 and 3, FIG. 2 shows a typical electrochemical cell having an anode 103, cathode 107, membrane 108, low pressure flow field 110, high pressure flow field 112, high pressure separator plate 114, pressure pad 116. Meanwhile, FIG. 3 illustrates one embodiment of the electrochemical cell of present invention having an anode 103, cathode 107, membrane 108, low pressure flow field 110, high pressure flow field 112, and an electrically conductive pressure pad 118.

In a water electrolysis cell having an active area of 0.1 square feet ($ft^2$) and constructed in accordance with FIG. 3, for example, water at a pressure of 10 p.s.i. was passed across the anode electrode by means of a low pressure flow field chamber. A voltage of approximately 2 volts was applied to the cell while 100 amperes of direct current (DC) were directed through the cell. The Viton® pressure pad assembly was mechanically loaded to 50 p.s.i., and hydrogen gas was produced at a pressure of 150 p.s.i.

In another embodiment of the present invention, a high pressure fluid, such as water (under pressure up to or exceeding about 100 p.s.i., 500 p.s.i., 1,000 p.s.i., or even 2,500 p.s.i.), can be introduced to the high pressure side of the electrochemical cell which has a high pressure flow field disposed in intimate contact with an electrically conductive pressure pad of the present invention. The water passes through the high pressure flow field, migrates from the high pressure electrode, across the membrane, to the low pressure electrode where ions are formed. The ions migrate back across the membrane to the high pressure electrode where a second high pressure fluid is formed, such as hydrogen. The high pressure fluid then passes through the high pressure flow field.

In yet another embodiment of the present invention, a high pressure fluid (again under pressure up to or exceeding about 100 p.s.i., 500 p.s.i., 1,000 p.s.i., or even 2,500 p.s.i.), can be introduced to the high pressure side of the electrochemical cell which has a high pressure flow field disposed in intimate contact with an electrically conductive pressure pad of the present invention. The high pressure fluid is reacted on an electrode adjacent to and in fluid communication with the high pressure flow field to form ions which migrate across a membrane to a low pressure electrode. At the low pressure electrode a low pressure fluid is formed. This low pressure fluid then passes through a low pressure flow field.

Another embodiment of the present invention comprises introducing a low pressure fluid to a low pressure flow field where the low pressure fluid reacts on an electrode adjacent to and in fluid communication with the low pressure flow field to form ions which migrate across a membrane to a high pressure electrode. At the high pressure electrode, high pressure fluid is formed. The high pressure fluid then passes through a high pressure flow field disposed in intimate contact with the electrically conductive pressure pad of the present invention. The pressure of the high pressure fluid formed can have pressures of up to 400, 1,000, or 2,500 p.s.i, or greater, depending upon the system capabilities.

A further embodiment of the present invention comprises a pressure pad having a porosity gradient. This gradient not only improves fluid distribution to the membrane, but it also lowers the voltage required for the electrochemical reaction, and provides structural integrity to the membrane and electrode assembly, which can eliminate the need for a screen pack. The interwoven elastomer and conductive material can be layered such that the screen pack support is enhanced or replaced, and a gradient of porosity is formed. For example, layers of progressively more tightly woven pressure pad material can be layered to form a gradient. In this example, the layered pressure pad is oriented with the gradient facing either towards or away from the membrane, and located on either side of the membrane. In this configuration, the pressure pads serve not only as the means for ensuring the positive contact of the cell components, but also as the primary means of membrane support.

The electrochemical cell of the present invention utilizes pressure pads which are compatible with the electrochemical cell environment, are utilized in a unique fashion by placing them on the cathode side of the cell thereby only requiring the pads to be compressed to approximately 50 p.s.i., while being capable of withstanding pressures exceeding 2,000 p.s.i., and even exceeding 5,000 p.s.i., with the upper pressure limit controlled by the system capabilities. Further advantages of the present invention include lower electrical resistance thereby leading to higher current densities, simplicity of assembly and preparation, and lower cell voltage due to elimination of screen layers and the pressure pad cavity used with prior art pressure pads in order to protect them. Finally, due to the fewer parts, the electrochemical cell of the present invention is lower cost and has a higher reliability.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrochemical cell, comprising:
   a) a high pressure side electrode;
   b) a low pressure side electrode;
   c) a membrane disposed between and in intimate contact with said high pressure side electrode and said low pressure side electrode;
   d) means for providing a low pressure flow field;
   e) means for providing a high pressure flow field; and
   f) an electrically conductive pressure pad located adjacent to and in intimate contact with said high pressure flow field.

2. An electrochemical cell as in claim 1, wherein said pressure pad maintains substantially uniform pressure on said high pressure flow field.

3. An electrochemical cell as in claim 1, wherein said pressure pad is compatible with the electrochemical cell and can function in pressures exceeding 2,000 p.s.i.

4. An electrochemical cell as in claim 1, wherein said pressure pad comprises a support material and an electrically conductive material.

5. An electrochemical cell as in claim 4, wherein said support material is a fluorosilicone, fluoroelastomer, or mixture thereof.

6. An electrochemical cell as in claim 4, wherein said electrically conductive material is steel.

7. An electrochemical cell as in claim 4, wherein said electrically conductive material is a stainless steel, a nickel, cobalt, carbon, refractory metal, precious metal, or a mixture or alloy thereof.

8. An electrochemical cell as in claim 1, wherein said means for providing a low pressure flow field is a low pressure screen pack located adjacent to and in intimate contact with said low pressure side electrode.

9. An electrochemical cell as in claim 1, wherein said means for providing a high pressure flow field is a high pressure screen pack located adjacent to and in intimate contact with said high pressure side electrode.

10. An electrochemical cell as in claim 1, wherein said pressure pad is compatible with the electrochemical cell and can function in pressures exceeding 5,000 p.s.i.

11. An electrochemical cell as in claim 1, wherein said pressure pad comprises one or more layers of conductive material interwoven with an elastomer, said layers each having a porosity.

12. An electrochemical cell as in claim 11, wherein said conductive material is carbon.

13. An electrochemical cell as in claim 11, wherein said elastomer is a fluorosilicone, fluoroelastomer, or combinations thereof.

14. An electrochemical cell as in claim 11, wherein said pressure pad has a gradient of porosity.

15. An electrochemical cell as in claim 14, wherein said layers of differing porosity form said gradient.

16. An electrochemical cell as in claim 11, wherein the high pressure field operates at above 2000 p.s.i.

17. An electrochemical cell, comprising:
   a) a high pressure side electrode;
   b) a low pressure side electrode;
   c) a membrane disposed between and in intimate contact with said high pressure side electrode and said low pressure side electrode;
   d) a low pressure flow field;
   e) a high pressure flow field; and
   f) an electrically conductive pressure pad located adjacent to and in intimate contact with said high pressure flow field.

18. An electrochemical cell as in claim 17, wherein said pressure pad maintains substantially uniform pressure on said high pressure flow field.

19. An electrochemical cell as in claim 17, wherein said pressure pad is compatible with the electrochemical cell and can function in pressures exceeding 2,000 p.s.i.

20. An electrochemical cell as in claim 17, wherein said pressure pad comprises a support material and an electrically conductive material.

21. An electrochemical cell as in claim 20, wherein said support material is a fluorosilicone, fluoroelastomer, or mixture thereof.

22. An electrochemical cell as in claim 20, wherein said electrically conductive material is steel.

23. An electrochemical cell as in claim 20, wherein said electrically conductive material is a stainless steel, a nickel, cobalt, carbon, refractory metal, precious metal, or a mixture or alloy thereof.

24. An electrochemical cell as in claim 17, wherein said means for providing a low pressure flow field is a low pressure screen pack located adjacent to and in intimate contact with said low pressure side electrode.

25. An electrochemical cell as in claim 17, wherein said means for providing a high pressure flow field is a high pressure screen pack located adjacent to and in intimate contact with said high pressure side electrode.

26. An electrochemical cell as in claim 17, wherein said pressure pad is compatible with the electrochemical cell and can function in pressures exceeding 5,000 p.s.i.

27. An electrochemical cell as in claim 26, wherein the high pressure field operates at above 2000 p.s.i.

28. An electrochemical cell as in claim 17, wherein said pressure pad comprises one or more layers of conductive material interwoven with an elastomer, said layers each having a porosity.

29. An electrochemical cell as in claim 28, wherein said conductive material is carbon.

30. An electrochemical cell as in claim 28, wherein said elastomer is a fluorosilicone, fluoroelastomer, or combinations thereof.

31. An electrochemical cell as in claim 28, wherein said pressure pad has a gradient of porosity.

32. An electrochemical cell as in claim 31, wherein said layers of differing porosity form said gradient.

* * * * *